April 24, 1956 J. C. JANSMA 2,743,013
THERMAL DIFFUSION APPARATUS
Filed April 28, 1953
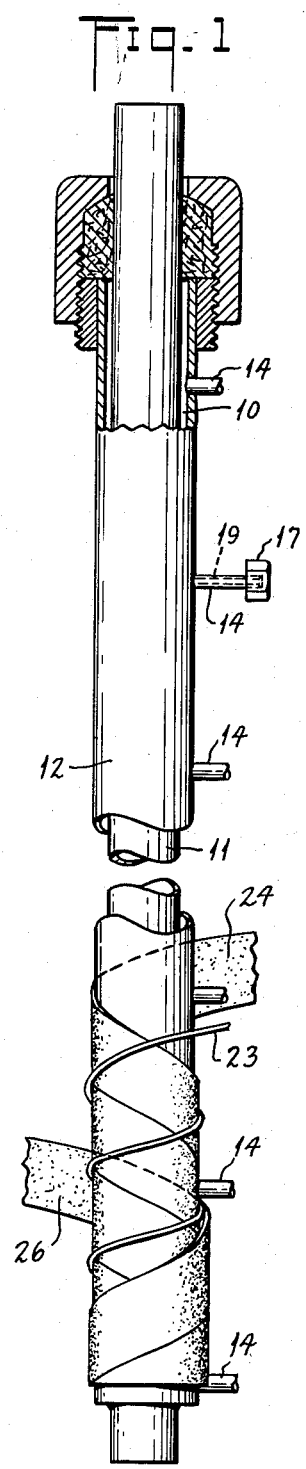
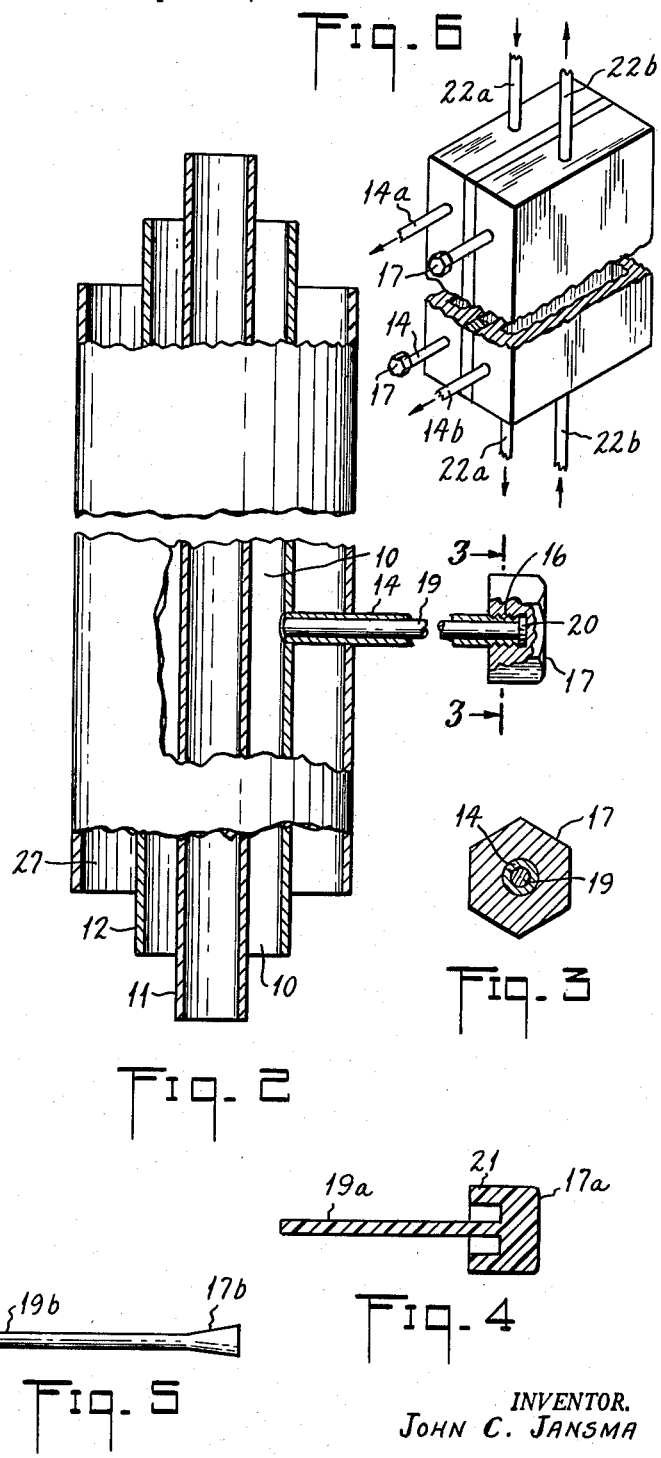
INVENTOR.
JOHN C. JANSMA
BY
Campbell, Brumbaugh, Free & Graves
ATTORNEYS United States Patent Office 2,743,013
Patented Apr. 24, 1956

2,743,013

THERMAL DIFFUSION APPARATUS

John C. Jansma, Maple Heights, Ohio, assignor to The Standard Oil Company, Cleveland, Ohio, a corporation of Ohio Application April 28, 1953, Serial No. 351,527

6 Claims. (Cl. 210—52.5)

The present invention relates to an improvement in apparatus for separating fluids into dissimilar fractions by thermal diffusion.

It has been known for many years that fluid mixtures subjected to a temperature gradient while being confined in a separation chamber defined by opposed, relatively hot and cold walls tends to separate into two or more fractions, one fraction enriched in one component of the mixture tending to accumulate adjacent one of the walls, and another fraction impoverished in said component tending to accumulate adjacent the other wall.

Apparatus designed for carrying out such thermal diffusion methods generally comprises two opposed walls capable of being relatively heated and cooled, which are spaced apart to form a thermal diffusion separation chamber, and one or more passages, serving as inlets, outlets or both, for the fluid mixture and the fractions into which they are separated. These passages are generally elongated and are distinct from, though they communicate with, the separation chamber in the sense that fluid therein is not subjected to a temperature gradient until it leaves the passage and enters the separation chamber.

Thermal diffusion methods in which a batch of fluid is introduced into a separation chamber and kept there until the contents have been resolved into two or more fractions, require at least two such passages and desirably have a considerable number of such passages for most effective removal of the several fractions formed. Continuous methods, wherein a fluid mixture is continuously introduced into a separation chamber and two or more dissimilar fractions are continuously withdrawn, may also be carried out in apparatus having a considerable number of passages capable of serving as inlets or outlets, particularly if the apparatus is designed for maximum flexibility as to the variety of flow patterns that may be employed. When some or all of these passages are closed during operation of the apparatus, the volume of fluid within the passages that is not subject to thermal diffusive forces may become an appreciable proportion of the volume of fluid within the separation chamber. This is especially true when the separation chamber is designed for the separation of liquid as opposed to gaseous mixtures. The fluid that is in passages not utilized as inlets or outlets during the operation remains substantially undisturbed throughout the thermal diffusion process and, since it is not subjected to thermal diffusion forces, tends to dilute the dissimilar fractions formed in the separation chamber as they are withdrawn through the passages.

The present invention is designed particularly to overcome the disadvantages resulting from the occupation, by relatively stagnant and unchanged fluid mixture, of an appreciable portion of the volume available to the fluid within thermal diffusion apparatus.

In accordance with the invention, thermal diffusion apparatus having wall members defining a separation chamber and at least one open ended means defining an elongated passage for fluid communicating with the chamber, is provided with a closure for the passage comprising an elongated member, preferably in the form of an elongated rod, insertable into the passage for displacing substantially the entire volume thereof. The closure is preferably also provided with means such as a cap member, for retaining the elongated member within the passage.

The closure is readily adapted for use in a thermal diffusion column having a separation chamber of annular cross-section formed by concentric tubes wherein the elongated means defining one or more passages for fluid communicating with the separation chamber are disposed radially or tangentially with respect to the separation chamber. It is also readily adaptable for use in flat plate type thermal diffusion columns wherein the separation chamber is vertical or horizontal and is formed by opposed plane walls and wherein the elongated means defining one or more passages for fluid communicating with the chamber are disposed in positions parallel or perpendicular with reference to the separation chamber.

The primary advantage of the apparatus of the present invention is that thermal diffusion apparatus can be provided with a considerable number of inlets and outlets when it is initially constructed and that any number of these inlets or outlets can be closed or neutralized at will to reduce to a minimum the space within the apparatus that not only does not contribute to the separation desired but would detract from the efficiency of the separation obtained in the separation chamber by dilution of the fractions as they are removed.

Other advantages, as well as the utility of the apparatus of the invention, will become more apparent from the following description made with reference to the accompanying drawing wherein:

Figure 1 is a schematic view in elevation of a concentric tube type thermal diffusion apparatus;

Figure 2 is an enlarged, detailed view in cross-section of a concentric tube type thermal diffusion apparatus similar to that shown in Figure 1 wherein an inlet or outlet is provided with one preferred embodiment of the closure in the present invention;

Figure 3 is a view in cross-section taken on section line 3—3 of Figure 2 showing a portion of the closure;

Figure 4 is a view in cross-section of a modified form of closure;

Figure 5 is a view of another modification of a closure; and

Figure 6 is a schematic view, in perspective, of a flat plate type thermal diffusion apparatus wherein two conduits are shown fitted with a closure of the invention.

Referring now to Figures 1 to 3, a separation chamber 10 defined by the outer surface of an inner tube 11 and the inner surface of an outer concentric tube 12 communicates with the exterior of the apparatus by way of elongated conduits 14 shown, in Figure 1, as being substantially equidistantly spaced along the length of the separation chamber. The conduit 14, shown in Figure 2, is threaded at 16 for engagement with the mating threads of a cap 17 having an elongated member, such as a rod 19, integral therewith or attached thereto. A sealing gasket 20 or the like is preferably provided at the base of the rod 19 to provide a perfect seal between the threaded end of the conduit 14 and the cap member 17.

Figure 4 illustrates an alternative embodiment of the closure of this invention wherein the rod 19a is formed integrally with the cap 17a and the whole is made of resilient material such that the skirt 21 of the cap 17a is adapted to be snugly friction-fitted to the end of the conduit 14.

Figure 5 illustrates another typical alternative embodiment wherein the rod 19b is formed integrally with a gradual enlargement 17b for snug, friction-fitted engagement with the interior of the conduit 14.

Figure 6 illustrates a plate type apparatus in which two of the conduits 14 are neutralized by closures of the type best shown in Figures 2 and 3 and wherein a fraction accumulating adjacent one wall is withdrawn by way of conduit 14a and a fraction accumulating adjacent the other wall is withdrawn by way of conduit 14b, heating and cooling media for the opposed walls being supplied and withdrawn by way of lines 22a and 22b.

In operation the fluid mixture to be subjected to thermal diffusion is introduced into the separation chamber and the chamber-defining walls thereof are relatively cooled and heated, e. g., by passing a cooling medium through the inner tube 11 of the apparatus shown in Figure 1 and heating the outer tube by means of a resistance wire 23 between insulating tapes 24 and 26, by passing a heating medium through the inner tube 11 of the apparatus shown in Figure 2 and a cooling medium through the exterior jacket 27, or vice versa, or by supplying and withdrawing heating and cooling media to the apparatus shown in Figure 6 by way of lines 22a and 22b.

If the operation is carried out batch-wise and the conduit 14 is to serve as both an inlet and an outlet, the fluid mixture, or a portion thereof enters the separation chamber 10 through the conduit 14, whereafter the closure is inserted to the position shown so that the rod 19 occupies substantially the entire volume of the conduit and the gasket seal 20 effectively seals the conduit against any leakage. When the thermal diffusion operation is completed, the rod 19 is simply removed from the conduit 14 by unscrewing the cap member 17.

It has been found, for example, that concentric tube type thermal diffusion apparatus having a plurality of substantially equidistantly spaced conduits 14, such as the apparatus illustrated in Figure 1, is capable, upon being filled with a mixture of cyclohexane and 2,4-dimethyl pentane and having its conduits effectively sealed during operation, of separating the mixture into as many, e. g., ten, distinct fractions as there are conduits, the purest fractions of cyclohexane being obtained by successively unsealing the upper three or four conduits and the purest fractions of 2,4-dimethyl pentane being obtained by successively unsealing the three or four lowest conduits after unsealing the intermediate conduits.

If, on the other hand, the thermal diffusion is carried out in a continuous manner and the passage formed by the conduit 14 is to be neutralized so as to inhibit any diluting action, the closure is maintained in the operative position shown in Figure 1 throughout the operation.

The foregoing operations are varied slightly if the embodiments shown in Figures 4 or 5 are employed, the only difference being that there is no necessity for screwing the cap member on to the conduit when the rod 19a or 19b is inserted, or unscrewing it when it is withdrawn.

It is to be understood that many modifications and changes will occur to those skilled in the art upon reading this description. All such changes and modifications are intended to be included within the scope of the invention as defined in the appended claims.

I claim:

1. Thermal diffusion apparatus having wall members defining a separation chamber, means for relatively heating and cooling the respective wall members to maintain a temperature gradient across the separation chamber, an open ended means defining an elongated passage for fluid communicating with the chamber, and a closure for the passage defining means comprising an elongated member insertable into the passage and being of substantially the same dimensions and volume as said passage for displacing substantially the entire volume of said passage.

2. The apparatus defined in claim 1 wherein a plurality of means defining elongated passages for fluid communicating with the chamber are spaced substantially equidistantly along the length of the chamber.

3. The apparatus defined in claim 1 comprising means for retaining the elongated member within and sealing the passage.

4. The apparatus defined in claim 2 wherein the retaining means comprises a cap fitting snugly over the passage defining means.

5. The apparatus defined in claim 4 wherein the passage defining means is a conduit threaded at one end and the means for retaining the elongated member within and sealing the passage comprises a cap internally threaded for engagement with the threaded portion of the conduit.

6. The apparatus defined in claim 4 wherein the cap has a skirt portion of substantially less length than the elongated member.

References Cited in the file of this patent

UNITED STATES PATENTS

| Number | Name | Date |
|---|---|---|
| 276,822 | Jewett | May 1, 1883 |
| 479,130 | Albert | July 19, 1892 |
| 891,109 | Speece | June 16, 1908 |
| 1,935,100 | Paull et al. | Nov. 14, 1933 |
| 2,179,423 | Pari | Nov. 7, 1939 |
| 2,541,070 | Jones et al. | Feb. 13, 1951 |
| 2,567,765 | Debye | Sept. 11, 1951 |
| 2,582,721 | Roshkind | Jan. 15, 1952 |